Nov. 22, 1966 W. H. E. WIDL 3,287,657

PHASE CONTROLLED OSCILLATOR WITH A VARIABLE SYNCHRONIZING RANGE

Filed April 6, 1964

INVENTOR
WALTER HERBERT ERWIN WIDL

United States Patent Office 3,287,657
Patented Nov. 22, 1966

3,287,657
PHASE CONTROLLED OSCILLATOR WITH A VARIABLE SYNCHRONIZING RANGE

Walter Herbert Erwin Widl, Bandhagen, Sweden, assignor to Telefonaktiebolaget L M Ericsson, Stockholm, Sweden, a corporation of Sweden Filed Apr. 6, 1964, Ser. No. 357,839
Claims priority, application Sweden, Apr. 9, 1963, 3,918/63
1 Claim. (Cl. 331—17)

This invention relates to a circuit arrangement for phase synchronization of a voltage controlled free-oscillating oscillator by means of an incoming frequency and by means of a comparator which in dependence on the difference between the incoming frequency and the frequency of the oscillator generates an output signal for controlling the oscillator.

The purpose of a phase controlled oscillator is to regenerate an incoming frequency, in other words to generate a signal which has a frequency and a phase equal to those of the incoming signal. Generally the oscillator has a rest frequency which appears when the controlling input signal is zero. If the rest frequency is designated by $f_0$ and the incoming frequency by $f_1$ it is a requirement that the oscillator shall be able to bring its frequency into synchronism with the frequency $f_1$ which is located near to the rest frequency $f_0$, by means of a signal obtained from the comparator in correspondence to the value $/f_1-f_0/$. The range within which all frequencies $f_1$ will result in synchronization is the so-called "capture range" which must be larger than the difference between the rest frequency of the oscillator and the incoming frequency, i.e. $\Delta f \geqq /f_1-f_0/$.

Generally not filtered signal residues and noise- and pulse-interferences are superposed on the incoming frequency. In order to decrease the instability upon the regeneration of a frequency a low pass filter is inserted before the comparator. If the limiting frequency of the low pass filter is too low the sensitivity to interferences of the above mentioned type will decrease but the time which is necessary to obtain synchronism after an interruption will increase. If on the other hand the limiting frequency of the low pass filter is too high the time necessary for obtaining synchonism will be shorter but the stability of the signal produced will be less good.

In practice an oscillator is required which is synchronized rapidly upon connection or interruption and which maintains the synchronism in spite of the above mentioned noise- and pulse-interferences. Such a phase controlled oscillator is built up according to the invention by connecting between the output of the comparator and the input of the oscillator, a low pass filter which in dependence on said frequency difference is controlled in such a way that the limiting frequency decreases with the decrease of the frequency difference.

Figure 1:
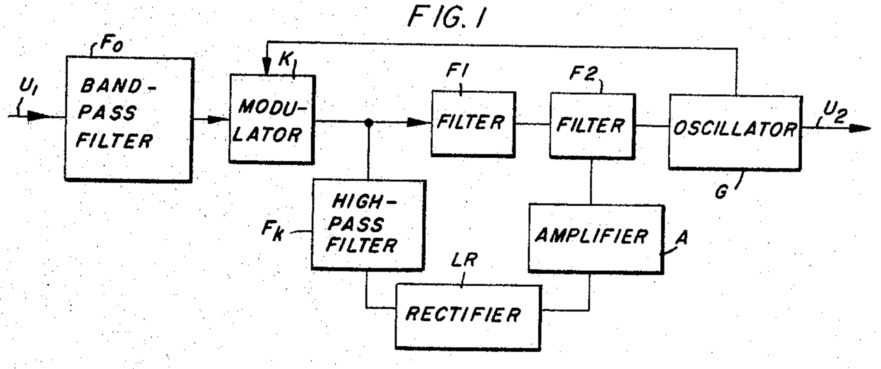
Figures 2, 3:
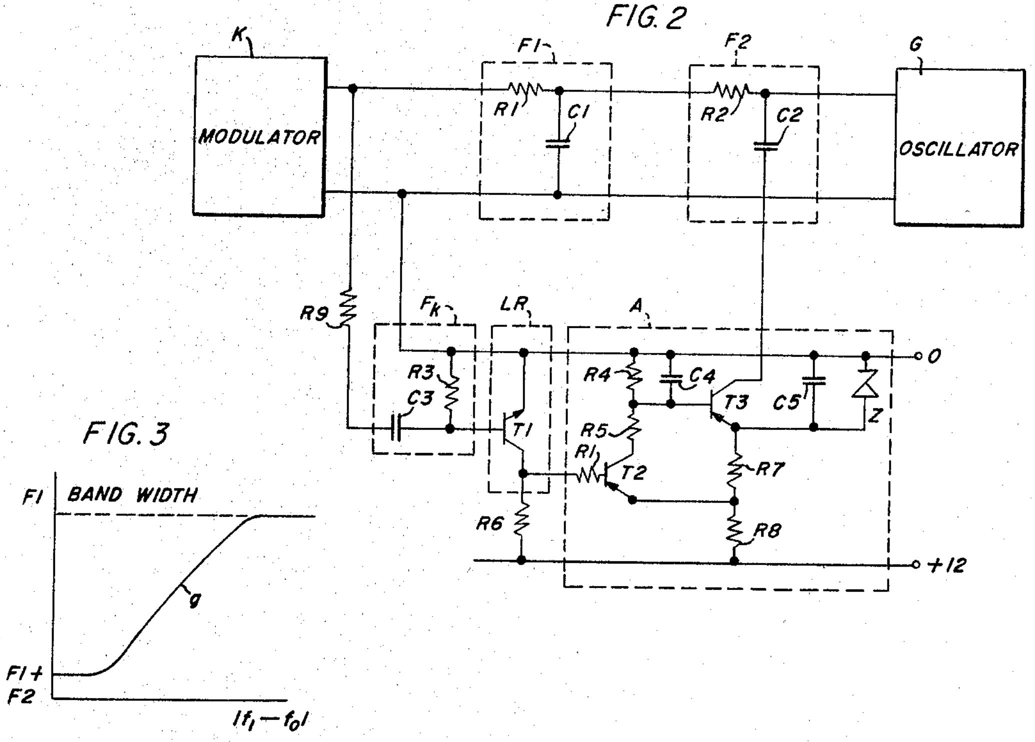
Figure 4:
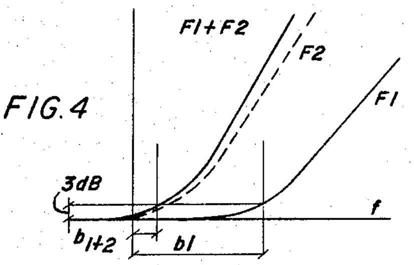

The invention will be further described below by means of an embodiment with reference to the enclosed drawing in which FIG. 1 shows a block diagram of a circuit arrangement according to the invention, FIG. 2 shows more in detail an example of a filter for use in the circuit arrangement, FIG. 3 is a diagram showing the variation of the band width of the filter as a function of the frequency difference between the incoming frequency and the rest frequency of the oscillator and FIG. 4 shows diagrammatically the band width before and after the connection of the filter.

The incoming signal U1 is supplied through a band pass filter F0 to a comparator K which simultaneously obtains an output signal from a self-oscillating oscillator G. The comparator which consists of a common modulator generates a signal which is used for controlling the own frequency of the oscillator. Between the output of the modulator and the input of the oscillator two filters F1 and F2 are connected after each other. F1 has a relatively wide band width and is permanently connected while F2 has a narrow band width and is connected only when the band width of the signals from the comparator shall be decreased. According to the principle of the invention, F1 which has a rather wide band width, is connected as long as synchronism has not been obtained after which the filter F2 which has a relatively narrow band width will be connected. The difference frequency $f_1-f_0$ passes through a high pass filter FK which allows passing of signals only when the difference frequency is relatively great. This signal is rectified by means of the rectifier LR and is conducted through the amplifier A to the filter F2 so that the latter is kept inactive as long as the difference frequency is high enough for allowing its passing through the filter FK. The capture range will be relatively large and the synchronization occurs rapidly. During the synchronization the difference $f_1-f_0$ will decrease and will finally be so little that it cannot pass through the high pass filter FK. In consequence of this the filter F2 will be connected and the synchronism obtained will be maintained owing to the low band width of the filter F2 in spite of incoming interferences. In order to eliminate transient phenomena upon connection of F2 the transition occurs continuously.

FIG. 3 shows an example of the practical design of a circuit arrangement according to the invention. In the same manner as shown in FIG. 1 two filters F1 and F2 are connected in series between the output of the modulator K and the input of the oscillator G. The difference frequency $f_1-f_0$ from the input of the modulator passes through the high pass filter FK which consists of C3 and R3. The base-emitter circuit of an NPN-transistor T1 is connected to the output of the filter FK. The transistor T1 becomes conducting for positive half-waves and the base of a transistor T2 which through a resistance R1 is connected to the collector at the transistor T1 obtains in the conducting condition of the transistor T1 the same potential to which the emitter of the transistor T1 is connected, i.e. 0-potential. Each time the transistor T1 becomes conducting also the transistor T2 will be conducting and the capacitor C4 which is connected in the collector circuit of the transistor T2 will be charged each time with a positive charge. The capacitor C4 is connected between 0-potential and the base of a PNP-transistor T3, the collector circuit of which comprises the shunt branch of the filter F2. When the capacitor C4 is not charged, the base potential of the transistor is 0, the transistor T3 is conducting and the capacitor C2 of the filter F2 is through the emitter circuit of the transistor T3 connected to 0-potential (through C5) according to the example whereby the filter F2 is in function. When the transistor T3 is blocked because of the charging of the capacitor C4, the capacitor C2 in the filter F2 will be inactive and consequently also the filter F2, so that only the filter F1 is in function. The relation between R4, R5 and C4 is chosen in such a way that separate disturbing pulses on the input of FK cannot charge the capacitor C4 to such a potential level which blocks the transistor T3. Upon reached synchronizing condition, $f_1-f_0=0$, the capacitor C4 will consequently no longer obtain positive charge, the transistor T3 becomes conducting and the filter F2 is in function which implies that the band width has become considerably more narrow.

Thus it is evident that as long as the difference frequency is great, i.e. no synchronization has been brought about, the band width is wide while when the difference frequency has decreased to a certain value, the band width will be narrow.

In order to eliminate transient phenomena upon connection of the filter F2 the transition occurs continuously. In FIG. 3 is shown an example of the relation between the band width of the filter device consisting of the filters F1 and F2 and the difference frequency $f_1$–$f_0$. The steepness of the curve is dependent on the level of the incoming frequency signal. The form of the curve *g* is determined by the attenuation of the filter FK, furthermore by the amplification of the amplifier A.

FIG. 4 shows diagrammatically the band width of the filter device when only F1 respectively and when F1 as well as F2 are in function.

The invention is evidently not limited to the embodiment shown and the principle of the invention is independent of the conduction type of the transistors (pnp or npn) or of the fact that other components are used instead of transistors. It is only essential that the band width of the filter device is changed in dependence on the difference frequency in such a way that at a great difference frequency the band width is wide and at a small difference frequency it is narrow.

I claim:

A circuit arrangement for phase synchronization of a voltage controlled free-oscillating oscillator by means of an incoming frequency and by means of a comparator which in dependence on the difference between said incoming frequency and the frequency of the oscillator generates an output signal for the control of the oscillator, characterized by the fact that between the output of the comparator and the input of the oscillator, two filters are connected with series after each other, of which filters one has an unchangeable characteristic while the other is controllable by means of the output signal of the comparator through a high pass filter in such a way that it gradually becomes effective as said oscillator approaches a synchronized condition.

References Cited by the Examiner

UNITED STATES PATENTS

| | | | |
|---|---|---|---|
| 2,828,419 | 3/1958 | Gruen | 331—17 |
| 2,962,666 | 11/1960 | Pollak | 331—17 X |

FOREIGN PATENTS

| | | |
|---|---|---|
| 1,107,269 | 5/1961 | Germany. |

ROY LAKE, *Primary Examiner.*

S. H. GRIMM, *Assistant Examiner.*